US008923668B2

(12) United States Patent
Hayashi et al.

(10) Patent No.: US 8,923,668 B2
(45) Date of Patent: Dec. 30, 2014

(54) RECEIVING METHOD AND SEPARATING APPARATUS FOR LIGHT OUTPUTTED FROM MULTI-CORE OPTICAL FIBER

(75) Inventors: Tetsuya Hayashi, Yokohama (JP); Osamu Shimakawa, Yokohama (JP)

(73) Assignee: Sumitomo Electric Industries, Ltd., Osaka-shi, Osaka (JP)

( * ) Notice: Subject to any disclaimer, the term of this patent is extended or adjusted under 35 U.S.C. 154(b) by 500 days.

(21) Appl. No.: 13/401,963

(22) Filed: Feb. 22, 2012

(65) Prior Publication Data

US 2012/0224808 A1    Sep. 6, 2012

(30) Foreign Application Priority Data

Feb. 25, 2011  (JP) ................ P2011-040526
Jan. 4, 2012   (JP) ................ P2012-000258

(51) Int. Cl.
*G02B 6/36*   (2006.01)
*G02B 6/26*   (2006.01)
*G01M 11/00*  (2006.01)
*G01M 11/08*  (2006.01)
*G02B 6/036*  (2006.01)
*G02B 6/02*   (2006.01)

(52) U.S. Cl.
CPC ............ *G01M 11/33* (2013.01); *G01M 11/088* (2013.01); *G02B 6/03683* (2013.01); *G02B 6/262* (2013.01); *G02B 6/02042* (2013.01); *G02B 6/3652* (2013.01)
USPC .............................................. 385/31; 385/50

(58) Field of Classification Search
None
See application file for complete search history.

(56) References Cited

FOREIGN PATENT DOCUMENTS

| JP | S63-049707 | 3/1988 |
| JP | 2011-242204 | 12/2011 |
| WO | WO 2009/107414 | 9/2009 |

OTHER PUBLICATIONS

Tetsuya Hayashi et al., "Crosstalk Variation of Multi-Core Fibre due to Fibre Bend", Proc. ECOC 2010, We.8.F.6, Sep. 2010.
Katsunori Imamura et al., "Multi-core holey fibers for the long-distance (>100 km) ultra large capacity transmission", Proc. OFC 2009, OTuC3, 2009.
K. Takenaga, "Reduction of Crosstalk by Quasi-Homogeneous Solid Multi-Core Fiber", Proc. OFC 2010, OWK7, 2010.

*Primary Examiner* — Sarah Hahm
(74) *Attorney, Agent, or Firm* — Drinker Biddle & Reath LLP

(57) ABSTRACT

According to the present invention, as a result of using a depressed or trench-assisted light-receiving waveguide in which the core is surrounded by a layer having a refractive index lower than that of a cladding as light-receiving means for receiving light outputted from a multi-core optical fiber, the layer of a low refractive index can inhibit the propagation of noise, etc. from the cladding to the core. Consequently, even in cases where the inter-core crosstalk is small, it is possible to accurately measure the inter-core crosstalk since components different from crosstalk-derived components in optical power are reduced.

8 Claims, 8 Drawing Sheets

Fig.3A Fig.3B Fig.3C
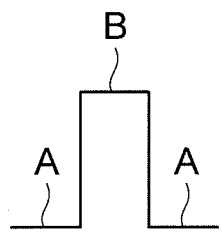
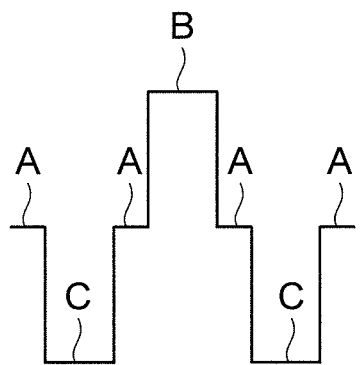
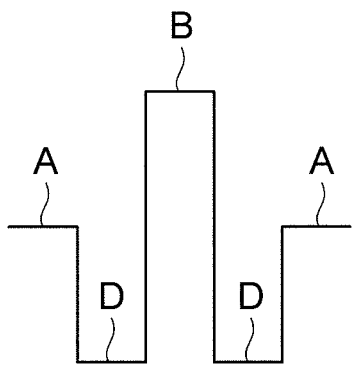

RECEIVING METHOD AND SEPARATING APPARATUS FOR LIGHT OUTPUTTED FROM MULTI-CORE OPTICAL FIBER

BACKGROUND OF THE INVENTION

1. Field of the Invention

The present invention relates to a method of receiving light outputted from a multi-core optical fiber, and a separating apparatus of separating light outputted from a multi-core optical fiber.

2. Related Background Art

In recent years, multi-core optical fibers each including a plurality of cores are being actively researched. A multi-core optical fiber is configured, for example, by a plurality of cores being arranged two-dimensionally in a cross section orthogonal to a longitudinal direction thereof, and it is known that crosstalk is generated between such plurality of cores. The method of measuring inter-core crosstalk in such a multi-core optical fiber and a light-receiving method of receiving light outputted from the multi-core optical fiber during measurement are disclosed, for example, in Proc. ECOC'10, We.8.F.6 (2010) (Non-patent Document 1), Proc. OFC'09 OTuc3 (2009) (Non-patent Document 2), and Proc. OFC'10 OWK7 (2010) (Non-patent Document 3). Specifically, measurement of the crosstalk is performed as the measurement of the transfer rate of the optical power from the coupling source core to the coupling destination core.

SUMMARY OF THE INVENTION

The present inventors have examined the above prior art, and as a result, have discovered the following problems. That is, when attempting to measure the crosstalk of a multi-core optical fiber in which the inter-core crosstalk caused by incident light propagation is extremely low, there are cases where accurate measurement cannot be performed since the noise light or the crosstalk during the coupling with the light-receiving optical fiber is larger. Specifically, when the coupling destination core and the core of the exit-side light-receiving optical fiber are aligned at the emission end of the multi-core optical fiber, output light from the coupling source core which is far more larger than the output light from the coupling destination core will enter the cladding of the light-receiving optical fiber. Here, depending on the state of the fiber end or the fiber structure, the light that entered the cladding of the light-receiving optical fiber is coupled with the core of the light-receiving optical fiber, and becomes noise during the measurement.

The present invention has been developed to eliminate the problems described above. It is an object of the present invention to provide a light-receiving method of receiving light outputted from a multi-core optical fiber which enables the accurate measurement of inter-core crosstalk even when the inter-core crosstalk is small, as well as a separating apparatus.

In order to achieve the foregoing object, the method of receiving light outputted from a multi-core optical fiber according to the present invention, as a first aspect, disposes a light-receiving waveguide having a unique structure on an emission end side of the multi-core optical fiber, causes a measurement beam to enter a first core on a first end face of the multi-core optical fiber, guides, through the light-receiving waveguide, light outputted from a second core that is different from the first core on a second end face opposing the first end face of the multi-core optical fiber, and receives the light that was guided through the light-receiving waveguide.

Here, the light-receiving waveguide is disposed at a position where the light outputted from the multi-core optical fiber reaches, and is a waveguide for guiding the light outputted from the core of the multi-core optical fiber and having a refractive index structure of depressed type or trench-assisted type in which the core is surrounded by a layer having a refractive index lower than that of a cladding.

Note that the at least one of the layer constituting the depressed type (depressed layer) and the layer constituting the trench-assisted type (trench layer) does not need to be configured entirely from a solid, and may also be a structure where the average refractive index is lower than that of the cladding due to a hole.

In accordance with the light-receiving method according to the first aspect, as a result of using a depressed type or trench-assisted type light-receiving waveguide in which the core is surrounded by the layer having a refractive index lower than that of a cladding as light-receiving means for receiving the light outputted from the multi-core optical fiber, the layer of the low refractive index can inhibit the propagation of noise and the like from the cladding to the core. Consequently, even in cases where multi-core optical fiber with as small inter-core crosstalk is measured, it is possible to accurately measure the inter-core crosstalk since components that are different from crosstalk-derived components in optical power are reduced.

Here, as a configuration which effectively yields the foregoing effect (as a second aspect that can be applied to the first aspect), the following aspect may be adopted. Specifically, the light-receiving waveguide includes a light-receiving optical fiber composed of a glass material in which its surface is covered with a coating. After the second core of the multi-core optical fiber and a core of the light-receiving optical fiber are aligned, the multi-core optical fiber and the light-receiving optical fiber are retained without being bonded with an adhesive. In a terminal portion of the light-receiving optical fiber including an end face facing the second core of the multi-core optical fiber, a glass portion from which the coating has been removed is exposed, or the glass portion is covered by the coating. In the second aspect, the light outputted from the second core of the multi-core optical fiber enters the core of the light-receiving optical fiber in a state where a ferrule is not mounted on the terminal portion of the light-receiving optical fiber.

As another configuration which effectively yields the foregoing effect, the following aspect (a third aspect that can be applied to the first aspect) can be adopted. Specifically, the light-receiving waveguide includes a light-receiving optical fiber composed of a glass material in which its surface is covered with a coating. After the second core of the multi-core optical fiber and a core of the light-receiving optical fiber are aligned, the multi-core optical fiber and the light-receiving optical fiber are bonded with an adhesive. A transparent ferrule is mounted via an adhesive on a terminal portion of the light-receiving optical fiber including an end face facing the second core of the multi-core optical fiber in a state where the glass portion from which the coating has been removed is exposed. Note that the refractive index of the adhesive used for mounting the ferrule is higher than that of the cladding of the light-receiving optical fiber. In the third aspect, the light outputted from the second core of the multi-core optical fiber enters the core of the light-receiving optical fiber in a state where the transparent ferrule is mounted on the terminal portion of the light-receiving optical fiber.

Moreover, the light-receiving method of receiving light outputted from a multi-core optical fiber according to the present invention, as a fourth aspect, disposes a light-receiving waveguide having a unique structure on an emission end side of the multi-core optical fiber, causes a measurement beam or signal light to enter one or more cores on a first end face of the multi-core optical fiber, separates the light outputted from the respective cores on a second end face by guiding, through the light-receiving waveguide, the light outputted from the respective cores on the second end face opposing the first end face of the multi-core optical fiber, and individually receives the light that was guided through the plurality of cores of light-receiving waveguide.

In the fourth aspect, the light-receiving waveguide is disposed at a position where the light outputted from the multi-core optical fiber reaches, and is a waveguide for guiding the light outputted from a core of the multi-core optical fiber and having a refractive index structure of depressed type or trench-assisted type which includes a plurality of cores and in which each of the cores is surrounded by a layer having a refractive index lower than that of a cladding. Moreover, at least one of the depressed layer and the trench layer is constituted by only solid having a refractive index lower than that of the cladding, or formed as a layer in which an average refractive index is lower than that of the cladding as a result of including a hole in the solid.

As a fifth aspect that can be applied to the fourth aspect, the light-receiving waveguide may have a refractive index structure including a trap layer which has a refractive index higher than that of the cladding and which is positioned further toward an outer side than the depressed layer or the trench layer.

Moreover, as the fifth aspect, the separating apparatus of separating light outputted from a multi-core optical fiber according to the present invention comprises a light-receiving waveguide for guiding light outputted from a core of the multi-core optical fiber. The light-receiving waveguide having a unique structure and disposed at a position where light outputted from the multi-core optical fiber will reach. The light-receiving waveguide has a refractive index structure of depressed type or trench-assisted type which includes a plurality of cores and in which each of the cores is surrounded by a layer having a refractive index lower than that of a cladding. Moreover, at least one of the depressed layer and the trench layer is constituted by only solid having a refractive index lower than that of the cladding, or may be formed as a layer in which an average refractive index is lower than that of the cladding as a result of including a hole in the solid.

In the fifth aspect, a measurement beam or signal light enters one or more cores on a first end face of the multi-core optical fiber. The light outputted from the respective cores on a second end face is separated by guiding, through the light-receiving waveguide, the light outputted from the respective cores on the second end face opposing the first end face of the multi-core optical fiber. Consequently, the light that was guided through the plurality of cores of light-receiving waveguide is individually received.

As a configuration which effectively yields the effect of the fifth aspect, the following aspect (a sixth aspect that can be applied to the fifth aspect) may be adopted. Specifically, the light-receiving waveguide is configured from a plurality of single-core optical fibers in which terminal portions on one side thereof are bundled. The bundled terminal portion of the light-receiving waveguide is constituted as a ferrule or a connector in a state where the plurality of single-core optical fibers are aligned to match the core arrangement of the multi-core fiber. Meanwhile, the other terminal portion of the light-receiving waveguide allows the plurality of single-core optical fibers to be individually separated.

BRIEF DESCRIPTION OF THE DRAWINGS

FIGS. 3A to 3C are diagrams showing an example of the refractive index profile of the light-receiving optical fiber;

DESCRIPTION OF THE PREFERRED EMBODIMENTS

Figure 1:
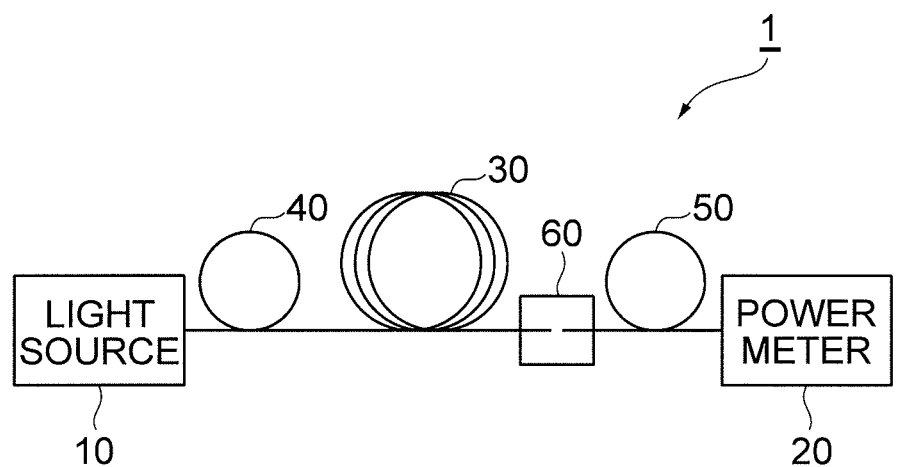
FIG. 1 is a diagram showing an example of the device configuration upon measuring inter-core crosstalk of a multi-core optical fiber, and receiving light outputted from the multi-core optical fiber during measurement.

In the following, the preferred embodiments for implementing the present invention will be explained in detail with reference to the appended drawings. Note that the same elements in the explanation of the drawings are given the same reference numeral and the redundant explanation thereof is omitted.

FIG. 1 is a diagram showing an example of the device configuration upon measuring inter-core crosstalk of a multi-core optical fiber, and receiving light outputted from the multi-core optical fiber during measurement. When measuring the inter-core crosstalk of a multi-core optical fiber, a measurement beam is caused to enter only a specific core of the multi-core optical fiber to be measured, and it is necessary to measure the light emitted from that core or a specific core such as another core. Thus, as shown in FIG. 1, the inter-core crosstalk measuring device 1 comprises a light source 10, a single-mode optical fiber 40 (light-transmitting optical fiber) that is optically connected to any one of the cores on an entrance end of the multi-core optical fiber 30 in which one end thereof is to be measured, a single-mode optical fiber 50 (light-receiving optical fiber as the light-receiving waveguide), an optical part 60 for optically connecting an emission end of the multi-core optical fiber 30 and the single-mode optical fiber 50, and a power meter 20. Specifically, in the measuring device 1, as one example, the multi-core optical fiber 30 to be measured is disposed between the light source 10 and the power meter 20. A single-mode optical fiber 40 is disposed on the entrance end side of the multi-core optical fiber 30 and a single-mode optical fiber 50 is disposed on the emission end side, respectively. The multi-core optical fiber 30 and the single-mode optical fiber 50 are connected via the optical part 60 for connecting the cores. Moreover, optical waveguides or the like may be used in substitute for the single-mode optical fibers 40, 50.

Here, the single-core optical fiber or optical waveguide disposed at a latter stage (output end side) than the multi-core optical fiber 30 for guiding the light outputted from the multi-core optical fiber 30 to be measured is referred to as a light-receiving waveguide in the present embodiment. Moreover, the single-mode optical fibers 40, 50 are made from a glass material in which its surface is covered by a coating.

Figure 2A:
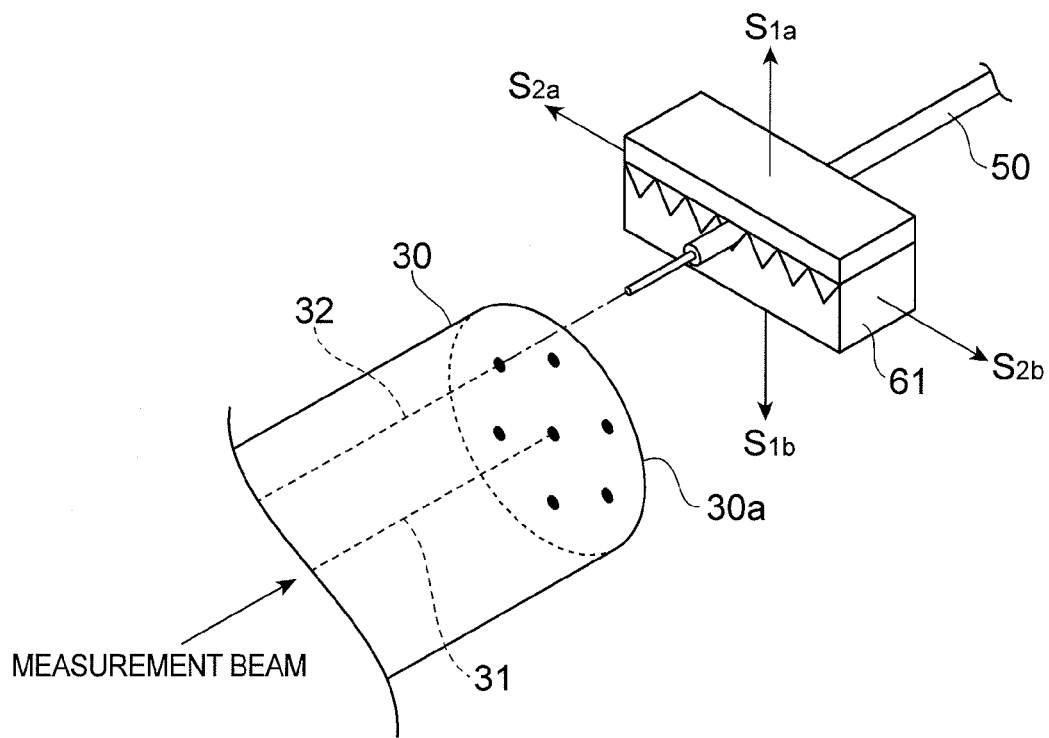
FIGS. 2A and 2B are diagrams explaining the optically connected state of the multi-core optical fiber and the light-receiving optical fiber.
Figure 2B:
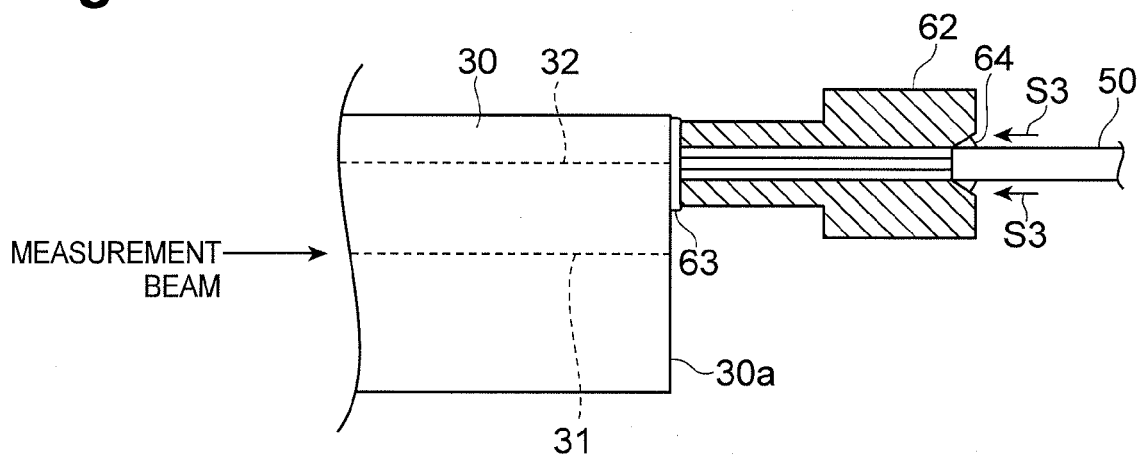

The coupling of the cores of the multi-core optical fiber 30 and the single-mode optical fiber 40 can be realized, for example based on the configuration shown in FIGS. 2A and 2B. FIG. 2A shows, as one example, the configuration of realizing non-contact optical coupling. Moreover, the example of FIG. 2B shows a configuration where the cores of the multi-core optical fiber 30 and the single-mode optical fiber 40 are fixed via an adhesive. Note that the measurement beam is introduced into the first core 31 of the multi-core optical fiber 30 to be measured. The single-mode optical fiber 50 is optically coupled to a second core 32 that is different from the first core 31 on the emission end face 30a in order to measure the inter-core crosstalk in the multi-core optical fiber 30 (light outputted from the second core 32 is guided through the single-mode optical fiber 50).

In FIG. 2A, a terminal portion of the single-mode optical fiber 50 is placed on a holder 61 configured from a lower member and an upper member with V-grooves formed therein. The holder 61 moves in the horizontal direction shown with arrows $S_{1a}$, $S_{1b}$ in the diagram, and also moves in the vertical direction shown with arrows $S_{2a}$, $S_{2b}$ in the diagram. As a result of the holder 61 to which one terminal portion of the single-mode optical fiber 50 is placed relatively moving the core of the single-mode optical fiber 50 relative to the second core 32 in the multi-core optical fiber 30, the second core 32 and the core of the single-mode optical fiber 50 are aligned in the multi-core optical fiber 30. Note that, in the example of FIG. 2A, after the alignment, the multi-core optical fiber 30 and the single-mode optical fiber 50 are retained without being bonded via an adhesive. Moreover, in the terminal portion of the single-mode optical fiber 50 including the end face facing the second core 32 of the multi-core optical fiber 30, a glass portion from which the coating has been removed is exposed (or the glass portion may be covered by the coating). A ferrule is not mounted on the terminal portion of the single-mode optical fiber 50. In accordance with this configuration, the light outputted from the second core 32 of the multi-core optical fiber 30 enters the core of the single-mode optical fiber 50 in a state where a ferrule is not mounted on the end thereof.

Meanwhile, in FIG. 2B, after the second core 32 of the multi-core optical fiber 30 and the core of the single-mode optical fiber optical fiber 50 are aligned, the multi-core optical fiber 30 and the single-mode optical fiber 50 are bonded via an adhesive 63. Subsequently, a transparent ferrule 62 is mounted via an adhesive 64 on a terminal portion of the single-mode optical fiber 50 including an end face facing the second core 32 of the multi-core optical fiber 30 in a state where the glass portion from which the coating has been removed is exposed (the ferrule 62 moves along the terminal portion of the single-mode optical fiber 50 along arrow S3). Note that the refractive index of the adhesive used for mounting the ferrule is higher than that of the cladding of the single-mode optical fiber 50. In accordance with this configuration, the light outputted from the second core 32 of the multi-core optical fiber 30 enters the core of the single-mode optical fiber 50 in a state where the transparent ferrule is mounted on the terminal portion thereof.

Considered is a case of disposing the light-receiving waveguide at a latter stage of the multi-core optical fiber 30 and causing the measurement beam outputted from the multi-core optical fiber 30 through the light-receiving waveguide, and thereby measuring the inter-core crosstalk in a multi-core optical fiber in which the inter-core crosstalk arising during the propagation of the measurement beam is extremely small. Under the foregoing conditions, it was confirmed that crosstalk that is greater than the inter-core crosstalk based on the propagation of light that is expected from a theoretical value could be measured. In addition, the present inventors discovered that this value cannot be explained even upon giving consideration to the inter-core crosstalk in a coupling portion of a multi-core optical fiber and a light-receiving waveguide that is expected from the following mathematical formula (1), which is a conventional formula of the coupling efficiency of butt-coupling (Katsunari Okamoto, Fundamentals of Optical Waveguides, Corona Publishing).

$$c_{pq} = \frac{\int_{-\infty}^{\infty}\int_{-\infty}^{\infty} u_z \cdot (E_p^* \times H_q + E_q \times H_p^*)\, dx\, dy}{\int_{-\infty}^{\infty}\int_{-\infty}^{\infty} u_z \cdot (E_p^* \times H_p + E_p \times H_p^*)\, dx\, dy} \quad (1)$$

Note that, in the foregoing mathematical formula (1), E is a vector of an electric field, H is a vector of a magnetic field, the parameter having p as the index (subscript) is a component on the output side of the butt coupling, the parameter having q as the index (subscript) is a component on the entrance side, and $U_z$ is a unit vector of light in the propagation direction.

When the foregoing mathematical formula (1) is simply rewritten based on an electric field of a scalar display, the following mathematical formula (2) is obtained, and the coupling coefficient of the optical intensity can be represented as the following mathematical formula (3).

$$c_{pq} = \frac{\int_{-\infty}^{\infty}\int_{-\infty}^{\infty} E_p E_q\, dx\, dy}{\int_{-\infty}^{\infty}\int_{-\infty}^{\infty} E_p^2\, dx\, dy} \quad (2)$$

$$\mu_{pq} = c_{pq}^2 = \left(\frac{\int_{-\infty}^{\infty}\int_{-\infty}^{\infty} E_p E_q\, dx\, dy}{\int_{-\infty}^{\infty}\int_{-\infty}^{\infty} E_p^2\, dx\, dy}\right)^2 \quad (3)$$

Normally, in a single-mode optical fiber, the electric field distribution of the fundamental-mode monotonically decreases as it becomes separated from the center of the core.

Here, in order to examine the crosstalk in a coupling portion of a multi-core optical fiber and a light-receiving waveguide in which the inter-core crosstalk during the propagation of light is extremely small and can be ignored, an actual single-mode optical fiber was used to examine the relation (coupling power profile) of the core axis displacement and the coupling power in a coupling portion in which single-core optical fibers (single-mode optical fibers: SMF) were coupled. The coupling power was normalized to be 0 dB when there is no axis displacement.

FIGS. 3A to 3C show an example of the refractive index profile of a single-mode optical fiber. FIG. 3A shows a refractive index profile of a matched cladding type consisting of a core layer A and a core layer B having a refractive index higher than that of the cladding layer A, FIG. 3B shows a refractive index profile of a trench-assisted type including a trench layer C having a low refractive index inside the cladding layer A, and FIG. 3C shows a refractive index profile of a depressed type refractive index profile including a depressed layer D between the cladding layer A and the core layer B. In addition, FIG. 4 shows the coupling loss profile of the matched cladding type single-mode optical fibers, and FIG. 5 shows the coupling loss profile of the trench-assisted type single-mode optical fibers.

Figure 4:
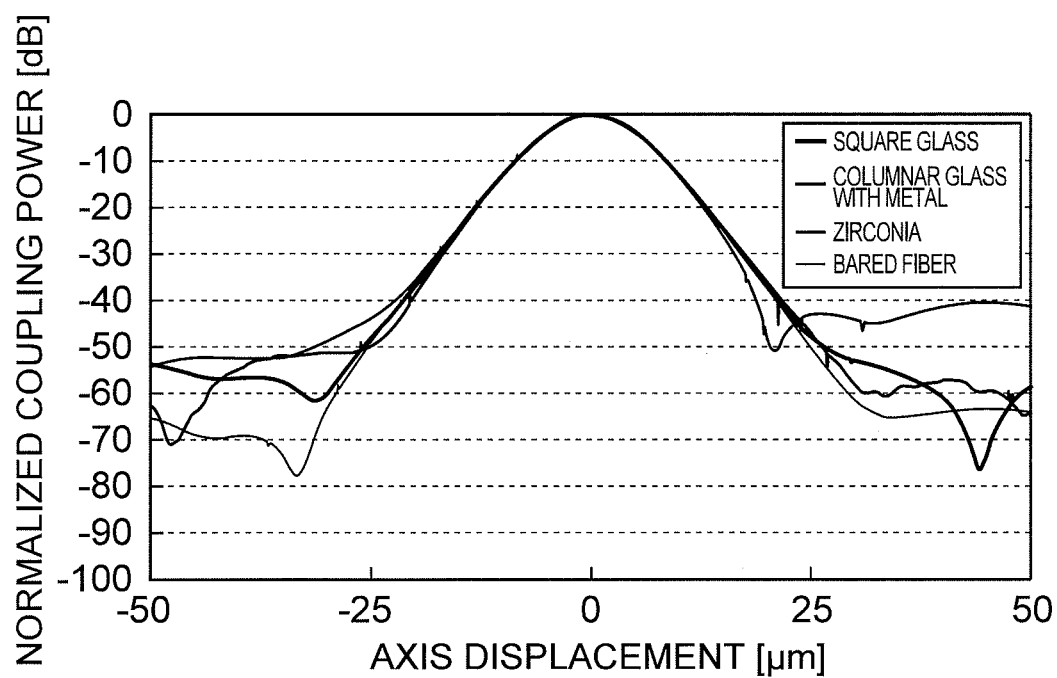
FIG. 4 is a coupling power profile when coupling the matched cladding type single-mode optical fibers.
Figure 5:
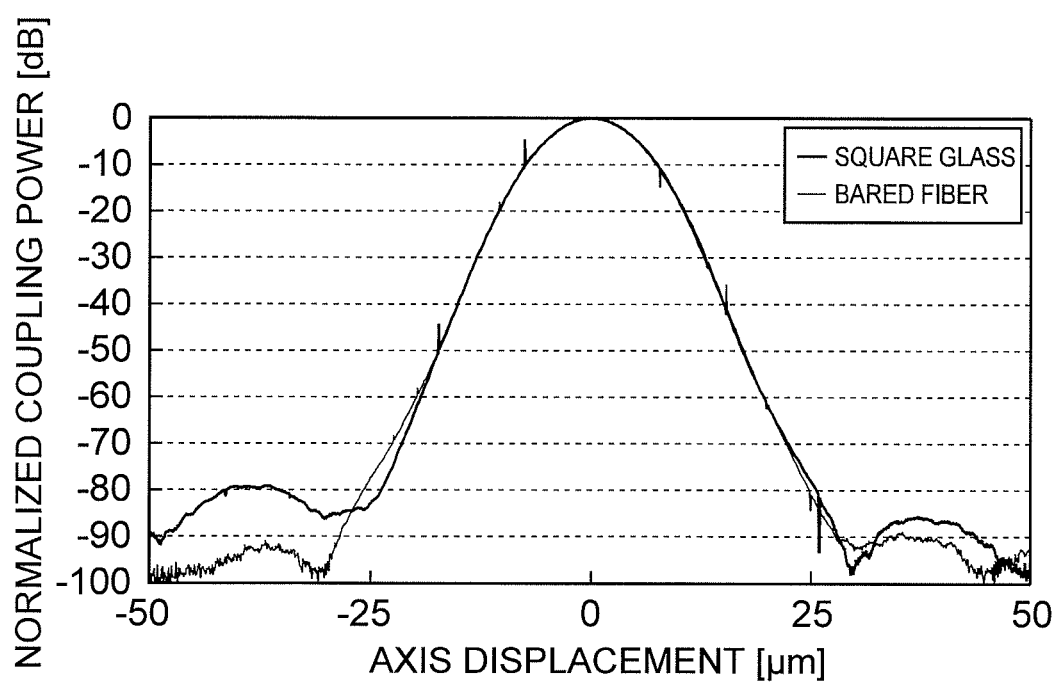
FIG. 5 is a coupling power profile upon coupling the trench-assisted type single-mode optical fibers.

Here, in FIGS. 4 and 5, "square glass," "columnar glass with metal," and "zirconia" respectively represent the material of the ferrule that is mounted on the terminal portion of the single-mode optical fiber 50. Specifically, the "square glass" represents a bar-shaped glass ferrule having a square cross section, the "columnar glass with metal" represents a glass ferrule in which a metal enclosure is mounted on the surface thereof, and "zirconia" represents a ferrule made from zirconia. Moreover, a "bared fiber" represents a state where the coating on the terminal portion of the single-mode optical fiber 50 is removed and the glass portion is exposed.

In both FIGS. 4 and 5, the portion of a clean single-peaked pattern and which is a portion that can be viewed in a range where the absolute value of the axis displacement is roughly 25 to 30 μm or less is the portion that can be explained with foregoing mathematical formulas (1) to (3). Meanwhile, the wavy portion that can be viewed in a range where the absolute value of the axis displacement is greater than 25 to 30 μm is the portion that cannot be explained with the mathematical formulas (1) to (3). The reason why the portion of the single-peaked pattern is of a sharper shape in FIG. 5 in comparison to FIG. 4 is because the spread of the core propagation mode is smaller in the latter.

Figure 6:
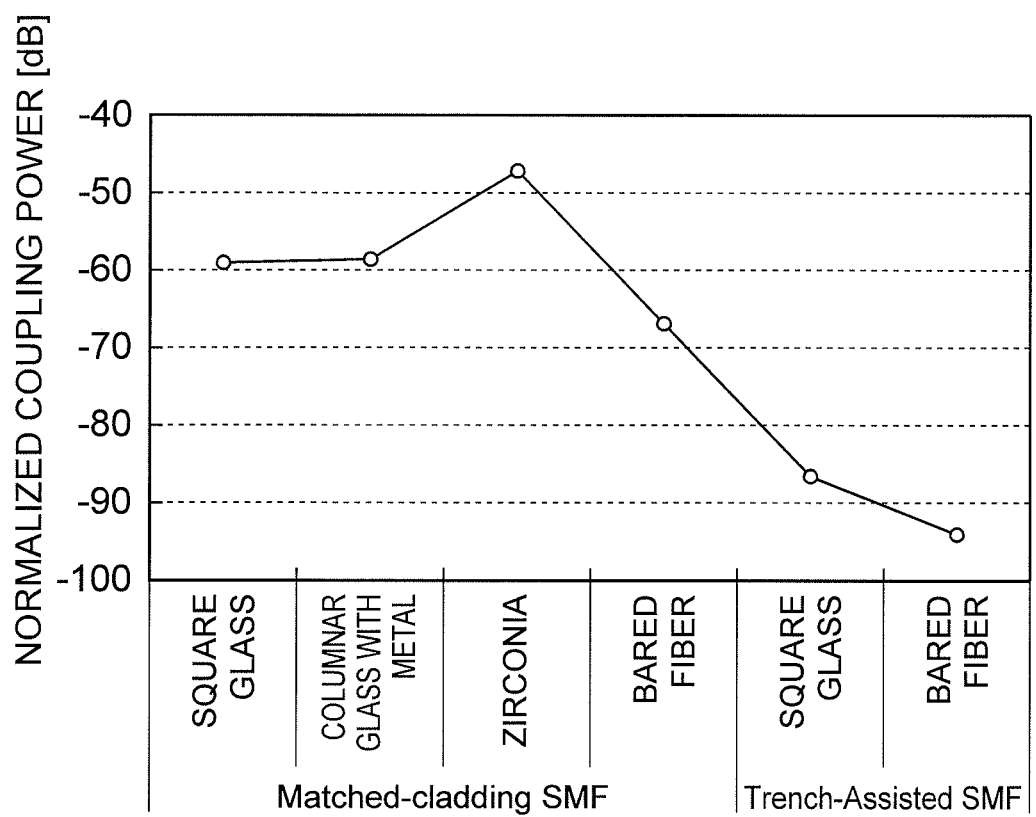
FIG. 6 is a diagram showing the normalized light-receiving power average in which the absolute value of the axis displacement is in a range of 30 to 50 µm.

Here, FIG. 6 shows the average of the coupling power of the range (range that cannot be explained with the mathematical formulas (1) to (3)) of FIGS. 4 and 5 in which the absolute value of the axis displacement is 30 to 50 μm.

In accordance with the results of FIG. 6, the average of the coupling power is high with respect to a fiber in the order of the matched cladding type single-mode optical fiber, and then the trench-assisted type single-mode optical fiber. Regarding a ferrule, it can be seen that the average of the coupling power is high in the order of the zirconia ferrule, the glass ferrule (regardless of the shape or existence of a metal part), and then the bared fiber. Among the above, it was confirmed that the reduction of the average of the coupling power was considerable when the trench-assisted type single-mode optical fibers were butt-coupled in comparison to the case when the matched cladding type single-mode optical fibers were butt-coupled.

The reasons why the foregoing results were obtained can be qualitatively explained as follows.

(A) Foremost, foregoing mathematical formulas (1) to (3) represent the coupling that occurs at only butted portion of the fiber end face. However, in reality, when the axis displacement increases, the coupling power to the core of the output-side optical fiber based on the butt-coupling will decrease, and most of the power will be coupled to the cladding. While the propagation mode of the cladding is unstable and the propagation loss is great, there is coupling while propagating from the cladding modes to the core mode, and this can be ignored when the coupling to the core in the butt-coupling is large, but cannot be ignored when the coupling to the core in the butt-coupling is small.

(B) Moreover, with the trench-assisted type single-mode optical fiber, since a trench layer having a lower refractive index exists around the core, the trench layer acts as a barrier and inhibits the coupling from the cladding modes to the core mode.

(C) The light that should have escaped outside the cladding is scattered or reflected to the ferrule or the adhesive used for bonding the ferrule and the optical fiber. Thus, the light that should have escaped outside the cladding is trapped in the cladding, and the power of light that is coupled from the cladding mode to the core mode is increased.

Based on the foregoing analysis, it was confirmed that the refractive index profile shape that is desirable as the light-receiving waveguide for use in a measuring system for measuring the inter-core crosstalk in a multi-core optical fiber to be measured includes the following features.

(1) A portion having a refractive index lower than that of a cladding exists between the core and the cladding such as trench-assisted type refractive index profile or depressed type refractive index profile.

(2) The trench layer or the depressed layer has a thickness and refractive index difference relative to the cladding which are sufficient for inhibiting the coupling from a cladding mode to a core mode.

(3) In the foregoing premise, the radius (trench outer diameter) from the core center to the interface of the trench layer and the cladding layer, or the radius (depressed layer) to the interface of the depressed layer and the cladding layer should be as small as possible. The reason for this is because, when measuring the inter-core crosstalk in a multi-core optical fiber, most of the power of the output light from the coupling source core is coupled to the outside of the cladding outer diameter or the depressed outer diameter on the butted surface of the multi-core optical fiber and the light-receiving waveguide upon receiving the output light from the coupling destination core with the light-receiving waveguide. This aims to prevent a component, which should inhibit the coupling to the core of the light-receiving waveguide, from becoming coupled to the inside of the barrier to be inhibited.

Moreover, when the light-receiving waveguide is an optical fiber (light-receiving optical fiber), the terminal portion butted with the multi-core optical fiber 30 preferably includes the following features.

(4) When it is not necessary to bond the multi-core optical fiber and the light-receiving optical fiber (when performing fusion or performing measurement on an aligning machine), desirably the coating is removed and the glass portion is exposed. However, if the refractive index of the coating is higher than that of the cladding and it is possible to cleanly cut the end face of the light-receiving optical fiber even with the coating remaining, the glass portion may be covered with a coating.

(5) When it is necessary to bond the multi-core optical fiber and the light-receiving optical fiber, the adherend of the light-receiving optical fiber and the ferrule needs to have an area of a certain size. Thus, preferably, the light-receiving optical fiber is in a state of being bonded to the ferrule. Moreover, the ferrule is preferably composed of a material that transmits, without scattering, light of the wavelength band that is used for measurement so that the scattered light does not return to the light-receiving optical fiber. In addition, so that the power of the cladding mode can easily escape to the ferrule, the ferrule and the adhesive for bonding the ferrule and the fiber have a refractive index that is higher than that of the cladding of the light-receiving optical fiber.

Figures 7A, 7B:
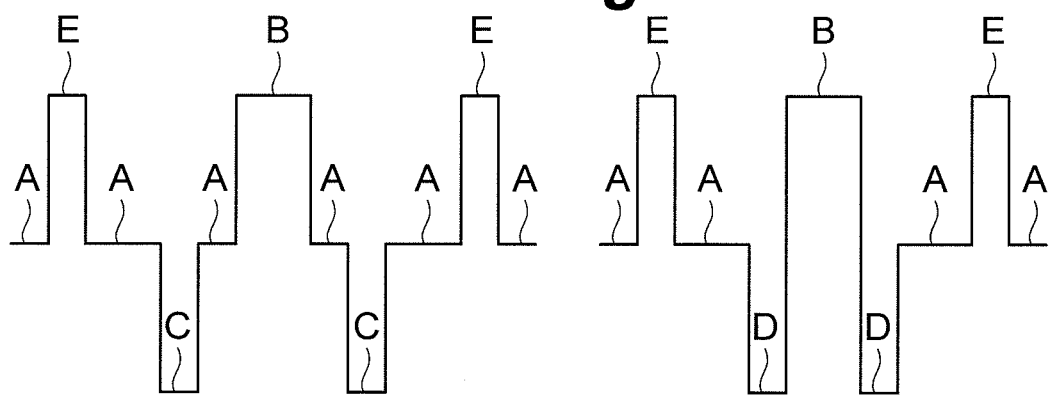
FIGS. 7A and 7B are diagrams explaining the refractive index profiles of the trench-assisted type structure and the depressed type structure having a trap layer, as the refractive index profile of the light-receiving optical fiber.

(6) When the refractive index of the ferrule and the adhesive for bonding the ferrule and the light-receiving optical fiber is lower than that of the cladding of the light-receiving optical fiber, it is also possible to provide, in the cladding on the outside of the trench interface or the depressed interface, a layer (trap layer) having a refractive index higher than that of the cladding, and couple the cladding mode to the trap layer. Here, even if a cladding is further provided outside the trap layer, the outside interface of the trap layer may be the interface of glass and air. An example of the refractive index profile of the light-receiving optical fiber provided with a trap layer is shown in FIGS. 7A and 7B. FIG. 7A shows a trench-assisted type refractive index profile including a trap layer E, and FIG. 7B shows a depressed type refractive index profile including a trap layer E. Note that, in the refractive index profile of FIG. 7A, a cladding layer A is provided to the outer periphery of the core layer B, and a trench layer C and a trap layer E are provided in the cladding layer A in order from the layer that is closest from the core B. Moreover, in the refractive index profile of FIG. 7B, a depressed layer D is provided between the core layer B and the cladding layer A, and a trap layer E is provided at a position in the cladding layer A and which is farther from the core layer B than the depressed layer D.

As described above, in accordance with the light-receiving method of receiving the light outputted from the multi-core optical fiber of the present embodiment, as a result of using a depressed type or trench-assisted type light-receiving waveguide in which the core is surrounded by a layer having a refractive index lower than that of a cladding as light-receiving means for receiving light outputted from a multi-core optical fiber, the layer of a low refractive index can inhibit the propagation of noise and the like from the cladding side to the core. Consequently, even in cases where the inter-core crosstalk is small, it is possible to accurately measure the inter-core crosstalk since components that are different from crosstalk-derived components in optical power are reduced.

Explanation mainly related to the measurement of the crosstalk was provided above, but the foregoing light-receiving waveguide may also have a plurality of cores, and the light-receiving method of the light outputted from the multi-core optical fiber of the present embodiment can also inhibit the inter-core crosstalk and extract signal light with low noise even upon simultaneously and individually extracting signal light from a plurality of cores of the multi-core fiber. Consequently, the present invention can also be suitably applied to a measuring method in which the influence of crosstalk other than the crosstalk measurement is a concern (for instance, measurement of transmission loss or cut-off wavelength), or the reception of signal light with light-receiving means relative to the multi-core optical fiber in the transmission system.

Figure 8:
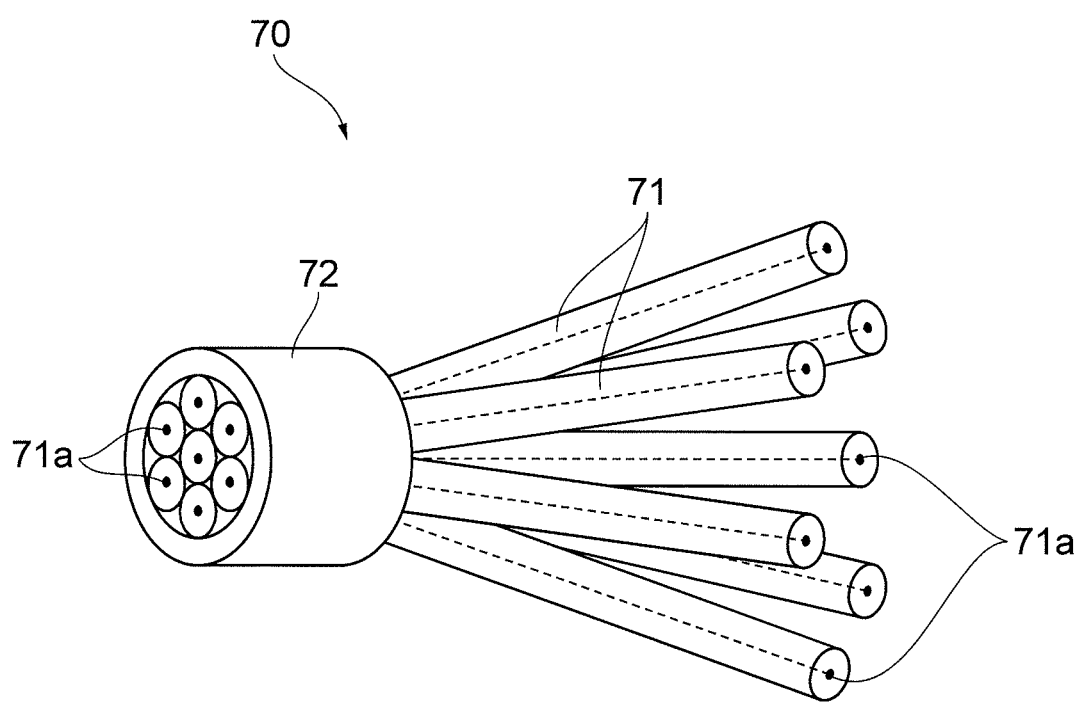
FIG. 8 is a diagram explaining an example of the configuration of a light-receiving waveguide.

The specific configuration of the light-receiving waveguide including the foregoing plurality of cores is shown in FIG. 8. The light-receiving waveguide 70 shown in FIG. 8 comprises a plurality of single-core optical fibers 71 which respectively include a core 71a and satisfy the features of the present invention, and a plurality of single-core optical fibers 71 are bundled at one terminal portion thereof. The one terminal portion is formed as a ferrule or a connector in a state where the plurality of single-core optical fibers 71 are aligned to match the core arrangement of the multi-core optical fiber 30 (FIG. 8 shows an example where one terminal portion is fixed by the ferrule 72). Meanwhile, at the other terminal portion of the light-receiving waveguide 70, the single-core optical fibers are separated one by one. The light-receiving waveguide 70 shown in FIG. 8 is a fan-out device where the plurality of single-core optical fibers 71 are bundled at one terminal portion in a state of maintaining a predetermined arrangement, and the plurality of single-core optical fibers 71 are respectively separated at the other terminal portion. This kind of light-receiving waveguide 70 can also be used as the light-receiving waveguide for guiding the light outputted from the respective cores on the emission end face 30a of the multi-core optical fiber 30.

In accordance with the present invention, it is possible to provide a light-receiving method of receiving light outputted from a multi-core optical fiber which enables the accurate measurement of the inter-core crosstalk even in cases of measuring a multi-core optical fiber having small inter-core crosstalk.

What is claimed is:

1. A light-receiving method of receiving light outputted from a multi-core optical fiber, the method comprising the steps of:
   disposing, at a position where light outputted from the multi-core optical fiber reaches, a light-receiving waveguide which guides light outputted from a core of the multi-core optical fiber, the light-receiving waveguide having a refractive index structure of depressed-type or trench-assisted type in which a core is surrounded by a layer having a refractive index lower than that of a cladding, wherein the layer constituting the depressed type or the trench-assisted type is constituted by only solid having a refractive index lower than that of the cladding, or formed as a layer in which an average refractive index thereof is lower than that of the cladding as a result of having holes in the solid;
   causing light to enter a first core on a first end face of the multi-core optical fiber;
   guiding light outputted from a second core through the light-receiving waveguide, the second core being different from the first core on a second end face opposing the first end face of the multi-core optical fiber; and
   receiving the light having been guided through the light-receiving waveguide.

2. The light-receiving method according to claim 1, wherein the light-receiving waveguide includes a light-receiving optical fiber composed of a glass material in which a surface thereof is covered with a coating,
   wherein, after the second core of the multi-core optical fiber and a core of the light-receiving optical fiber are aligned, the multi-core optical fiber and the light-receiving optical fiber are retained without being bonded with an adhesive,
   wherein, in a terminal portion of the light-receiving optical fiber including an end face facing the second core of the multi-core optical fiber, a glass portion from which the coating has been removed is exposed, or the glass portion is covered by the coating, and
   wherein the light outputted from the second core of the multi-core optical fiber enters the core of the light-receiving optical fiber in a state where a ferrule is not mounted on the terminal portion of the light-receiving optical fiber.

3. The light-receiving method according to claim 1, wherein the light-receiving waveguide includes a light-receiving optical fiber composed of a glass material in which a surface thereof is covered with a coating,
   wherein, after the second core of the multi-core optical fiber and a core of the light-receiving optical fiber are aligned, the multi-core optical fiber and the light-receiving optical fiber are bonded with an adhesive,
   wherein a transparent ferrule is mounted via the adhesive on a terminal portion of the light-receiving optical fiber including an end face facing the second core of the multi-core optical fiber in a state where the glass portion from which the coating has been removed is exposed,
   wherein the refractive index of the adhesive used for mounting the ferrule is higher than that of the cladding of the light-receiving optical fiber, and
   wherein the light outputted from the second core of the multi-core optical fiber enters the core of the light-receiving optical fiber in a state where the transparent ferrule is mounted on the terminal portion of the light-receiving optical fiber.

4. The light-receiving method according to claim 1, wherein the light-receiving waveguide has a refractive index structure including a trap layer which has a refractive index higher than that of the cladding and which is positioned further toward an outer side than the layer constituting the depressed type or the trench-assisted type.

5. A light-receiving method of receiving light outputted from a multi-core optical fiber, the method comprising the steps of:
- disposing, at a position where light outputted from the multi-core optical fiber reaches, a light-receiving waveguide which guides light outputted from cores of the multi-core optical fiber, the light-receiving waveguide having a plurality of cores, and a refractive index structure of depressed-type or trench-assisted type in which each of the cores is surrounded by a layer having a refractive index lower than that of a cladding, wherein the layer constituting the depressed type or the trench-assisted type is constituted by only solid having a refractive index lower than that of the cladding, or formed as a layer in which an average refractive index thereof is lower than that of the cladding as a result of having holes in the solid;
- causing light to enter one or more cores on a first end face of the multi-core optical fiber;
- separating light outputted from the respective cores on a second end face of the multi-core optical fiber by guiding the outputted light through the light-receiving waveguide, the second end face opposing the first end face of the multi-core optical fiber; and
- individually receiving the light having been guided through the plurality of cores of light-receiving waveguide.

6. The light-receiving method according to claim 5, wherein the light-receiving waveguide has a refractive index structure including a trap layer which has a refractive index higher than that of the cladding and which is positioned further toward an outer side than the layer constituting the depressed type or the trench-assisted type.

7. A separating apparatus of separating light outputted from a multi-core optical fiber, the separating apparatus comprising a light-receiving waveguide which guides light outputted from cores of the multi-core optical fiber, the light-receiving waveguide having a plurality of cores, and a refractive index structure of depressed-type or trench-assisted type in which each of the cores is surrounded by a layer having a refractive index lower than that of a cladding,
- wherein the light-receiving waveguide is disposed at a position where light outputted from the multi-core optical fiber reaches,
- wherein the layer constituting the depressed type or the trench-assisted type is constituted by only solid having a refractive index lower than that of the cladding, or formed as a layer in which an average refractive index thereof is lower than that of the cladding as a result of having holes in the solid,
- wherein light enters one or more cores on a first end face of the multi-core optical fiber;
- wherein light outputted from the respective cores on a second end face of the multi-core optical fiber is separated by guiding the outputted light through the light-receiving waveguide, the second end face opposing the first end face of the multi-core optical fiber, and
- wherein the light having been guided through the plurality of cores of light-receiving waveguide is individually received.

8. The separating apparatus according to claim 7, wherein the light-receiving waveguide is configured from a plurality of single-core optical fibers in which terminal portions on one side thereof is bundled, the bundled terminal portions are constituted as a ferrule or a connector in a state where the plurality of single-core optical fibers are aligned to match the core arrangement of the multi-core fiber, and terminal portions on the other side allow the plurality of single-core optical fibers to be individually separated.

* * * * *